United States Patent [19]

Fling

[11] Patent Number: 4,630,098

[45] Date of Patent: Dec. 16, 1986

[54] PROGRESSIVE SCAN DISPLAY SYSTEM WITH CORRECTION FOR NON-STANDARD SIGNALS

[75] Inventor: Russell T. Fling, Fishers, Ind.

[73] Assignee: RCA Corporation, Princeton, N.J.

[21] Appl. No.: 761,214

[22] Filed: Jul. 31, 1985

[51] Int. Cl.⁴ ............................................. H04N 5/95
[52] U.S. Cl. ................... 358/11; 358/21 R; 358/140; 358/148; 358/152; 358/160; 358/242
[58] Field of Search ............... 358/140, 11, 21 R, 148, 358/152, 160, 134, 166, 242

[56] References Cited

U.S. PATENT DOCUMENTS

| | | | |
|---|---|---|---|
| 4,400,719 | 8/1983 | Powers | 358/21 R |
| 4,415,931 | 11/1983 | Dischert | 358/140 |
| 4,573,080 | 2/1986 | Maze | 358/160 |
| 4,587,557 | 5/1986 | Doornhein | 358/11 |
| 4,593,315 | 6/1986 | Willis | 358/140 |

OTHER PUBLICATIONS

DataBook "Digit 2000 NTSC Double–Scan VLSI Digital TV System", published by ITT Intermetall Edition 1985/5, pp. 41–45, 47–72.

*Primary Examiner*—Howard W. Britton
*Attorney, Agent, or Firm*—P. J. Rasmussen; P. M. Emanuel; R. G. Coalter

[57] ABSTRACT

A double scanning receiver includes a video speed-up memory with read and write clocks locked to multiples of burst. Visible artifacts tend to be produced when displaying non-standard video signals (e.g., from a VCR, game, computer, etc.) due to skew of the memory clock signals with respect to horizontal sync. Skew artifacts are corrected by delaying the output signal of the memory as a direct function of the read clock skew and as an inverse function of the write clock skew. The write clock skew is measured for each memory read and write cycle. The read clock skew for the first memory read cycle is obtained by doubling the write clock skew measured at the start of the first read cycle. The read clock skew for the second memory read cycle is obtained by adding the write clock skew measured at the start of the second read cycle to a measured half-period of the video input signal and doubling the fractional part of the sum thereof. The integer part of the sum is detected to initiate the start of the second memory read cycle.

12 Claims, 7 Drawing Figures

PROGRESSIVE SCAN DISPLAY SYSTEM WITH CORRECTION FOR NON-STANDARD SIGNALS

FIELD OF THE INVENTION

This invention relates to television display systems and particularly to receivers or monitors of the type employing "progressive scanning" to reduce the visibility of vertical line structure of displayed images.

BACKGROUND OF THE INVENTION

Progressive scan television receivers have been proposed wherein the horizontal scan rate is doubled and each line of video is displayed twice thereby providing a displayed image having twice the usual number of scan lines and thus reduced visibility of vertical line structure. In a typical progressive scan receiver each incoming horizontal line of video signal is stored in one of two memories. As one line is being stored in one memory, the line previously stored in the other memory is recovered or "read" twice thereby providing two lines of time compressed video within one standard line interval. The memory output is applied to a display having a doubled horizontal sweep rate synchronized with read-out of the memory thereby doubling the number of displayed lines of video signal.

An example of a progressive scan receiver in which the additional scan lines added to the display are obtained by interpolation from the original scan lines is described by K. H. Powers in U.S. Pat. No. 4,400,719 entitled TELEVISION DISPLAY SYSTEM WITH REDUCED LINE-SCAN ARTIFACTS which issued Aug. 23, 1983. A receiver in which the added lines are replicas of the original lines is described by R.A. Dischert in U.S. Pat. No. 4,415,931 entitled TELEVISION DISPLAY WITH DOUBLED HORIZONTAL LINES which issued Nov. 15, 1983. The arrangements disclosed in these patents are incorporated by reference herein.

When implementing progressive scanning in a receiver with digital signal processing circuits, one may employ random access memories (RAM) for the line stores. Digital signal processing typically utilizes a coherent clock for purposes such as signal sampling (in the A/D converter), memory address control and other functions. For simplicity of chroma processing (e.g., decoding) it is advantageous to phase lock the clock to an integer multiple of the color subcarrier frequency. For NTSC standard video signals the memory write clock frequency is typically selected to be four-times that of the color subcarrier (4 Fsc) or about 14.3 MHz with a period of about 70 nanoseconds. One line of memory, for this clock frequency and the standard NTSC line period of about 63.5 microseconds, therefore requries 910 locations (addresses) in RAM to store 910 video samples or picture elements ("pixels" hereinafter). This memory requirement is invarient for NTSC standard signals because under the NTSC standard there are exactly 227.5 color subcarrier cycles per horozontal line. With D/A conversion done at four-times the color subcarrier frequency there are thus exactly 910 pixels per line (4×227.5). As long as the memory read clock is exactly double the frequency of the write clock, the result and "double-speed" or "time-compressed" pixels will have proper horizontal spacing and vertical alignment when displayed.

A problem exists is progressive scan systems of the type described (which employ "burst locked" clocks) when processing for display what will be referred to hereinafter as "non-standard" video input signals. As used herein, the term non-standard refers to video input signals wherein the ratio of the color subcarrier frequency to the horizontal line frequency does not conform exactly to a specified broadcasting standard (e.g., 227.5 in the NTSC standard). Where, for example, the video source is a video disc player, a video casette recorder, a video game unit or some other non-standard source, the burst/line-frequency ratio may vary continuously within certain limits. These limits may include a significant variztion from the standard ratio over a range of values. Under these conditions, the number of video samples (pixels) in a horizontal line period will not, in general, be an integer (e.g., 910). The number of 4 Fsc clock periods contained within one horizontal line period, in other words, may differ from the standard and this difference may include a fractional part of one clock cycle.

The deviation of the number of pixels per line from the standard value (e.g., 910) can result in a precession of the memory clock phase with respect to the incoming horizontal synchronizing signal phase. The effect of this precession or "phase-slip" or "skew" is that horizontal timing errors accumulate throughout each field scan interval. Moreover, the memory read clock precession relative to the double line-rate deflection will be twice as great as the precession of the memory write clock relative to the normal line-rate incoming video signal. This problem can cause accumulated horizontal timing errors which can result in full pixel discontinuities between occassional lines and other undesirable visible artifacts such as picture skew and ragged edges.

The need for skew correction of non-standard signals in a progressive scan processor employing a burst-locked clock has been recognized by Willis, et al. in U.S. Pat. Application Ser. No. 615,423 entitled PROGRESSIVE SCAN TELEVISION RECEIVER FOR NON-STANDARD SIGNALS filed May 29, 1984, now U.S. Pat. No. 4,593,315. In the Willis et al. system means are provided for measuring the phase of the speed-up memory read and write clocks with respect to the horizontal sweep of the display. Skew correction is provided by delaying the video signal recovered from the speed-up memory as a function of the difference between the read and write clock skew measurements each time the memory is read.

SUMMARY OF THE INVENTION

In an exemplary embodiment of the Willis et al. system, clock skew measurements are made with respect to timing of the display sweep. It is recognized herein that under certain circumstances the sweep timing may vary, for example, when the overall brightness of a displayed scene suddenly changes. This, in turn, may alter the skew correction to the extent that visible artifacts may be produced from time to time. The present invention is directed in a first respect to reducing such undesirable artifacts.

The principles of the invention may be applied to progressive scan display systems of the type including signal source means for supplying a video input signal of a given line rate, a write clock signal and a read clock signal to a video speed-up memory means which stores a horizontal line of the video input signal during a write cycle and recovers the stored line during each of first and second read cycles to provide a video output signal of double said given line rate to a display means synchronized therewith. The system further includes skew processing means comprising skew generator means for providing indicator signals related to skew of the read and write clock signals and skew corrector means responsive thereto for imparting an effective delay to the video output signal as a function of a difference between the read and write clock skew indicator during each memory read cycle.

In accordance with an aspect of the invention, the skew corrector means comprises first means for deriving both of the read and write clock skew indicator signals from the write clock signal and the video input signal and second means for doubling the values of the derived read clock skew indicator signal and for subtracting the write clock skew indicator signal therefrom to form a control signal for controlling the effective delay of the video output signal during each read cycle of the memory means.

In accordance with a further aspect of the invention the video output signal comprises a luminance component and a chrominance component and the skew corrector means includes means for effectively delaying the components as different functions of the delay control signal.

In accordance with a further feature of the invention the skew generator means includes means for measuring the horizontal line period of said video input signal and the skew corrector means includes means for initiating the second memory read cycle as a predetermined function of the line period measurement.

BRIEF DESCRIPTION OF THE DRAWING

The foregoing and further features of the invention are described in detail hereinafter and illustrated in the accompanying drawing wherein like elements are identified by like designators and in which.

DETAILED DESCRIPTION

Figure 1:
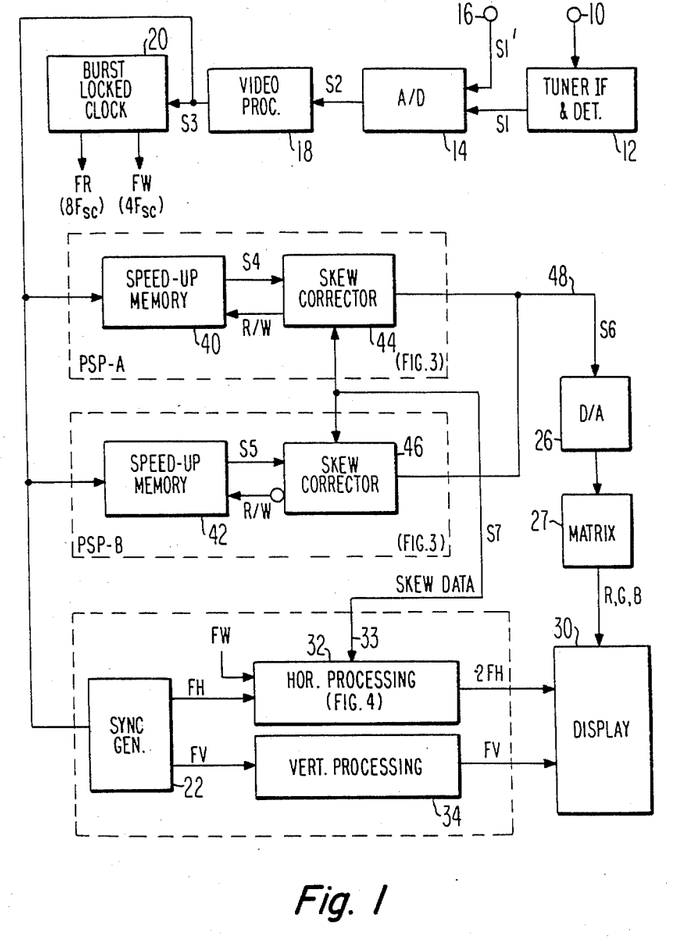
FIG. 1 is a block diagram of a television receiver embodying the invention.

The receiver of FIG. 1 includes an antenna (ANT.) input terminal 10 coupled via a tuner, IF amplifier and video detection unit 12 of conventional design to the input of an analog-to-digital converter 14. Unit 12 processes RF modulated video signals applies to terminal 10 to provide a baseband analog video signal S1 which is converted to digital form (signal S2) in (A/D) converter 14. The RF signal may be provided by an antenna, a tape recorder, video game, computer of other source. An auxilliary (AUX.) input terminal 16 is provided for obtaining the analog baseband video signal S1' from a source having provisions for baseband video output.

The digitized video signal S2 is applied to a video processing unit 18 of conventional design which provides various processing functions such as color separation, luminance peaking, contrast control, hue and saturation control, etc. The processed video signal S3 is applied to a burst locked clock 20, to a sync separator 22 and to a pair of progressive scan processors PSP-A and PSP-B (outlined in phantom). Clock 20 comprises a phase lock loop (PLL) keyed by horizontal sync pulses FH provided by sync separator 22 to provide read (FR) and write (FW) clock signals having frequencies locked to eight-times and four-times the frequency of the color subcarrier component (burst) of the video signal S3. For NTSC and PAL standard video input signals the 4 Fsc write clock frequencies are about 14,318 HMHz and 17,734 MHz, respectively. The read clock frequency (8 Fsc) is double the write clock frequency.

The line rate of the video signal S3 is doubled by means of a pair of speed-up memories 40 and 42 in progressive scan processors PSP-A and PSP-B, respectively. Briefly, as one line of the ivdeo input signal is being stored in memory 40 in response to the 4 Fsc write clock FW, a line previously stored in memory 42 is recovered two times in response to the 8 Fsc read clock FR. The clock signals are then reversed and the next line of the video input signal is stored in memory 42 while memory 40 is being read twice. This read/write sequence is illustrated by diagrams G and H of FIG. 2. The speeded-up video signals S4 and S5 provided by memories 40 and 42, respectively, are applied to respective skew correctors 44 and 46 which remove clock skew errors as will be described to provide skew corrected double line rate output signals. Each skew corrector includes a respective output switch ( e.g., a pair of tristate buffers, 95 and 97, shown in FIG. 2) synchronized with the memory read operations for coupling the output of corrector 44 to output bus 48 when memory 40 is being read and for coupling the output of corrector 46 to bus 48 when memory 42 is being read thereby producing the double line-rate video output signal S6 having the line sequence shown by sequence I of FIG. 2.

Figure 3:
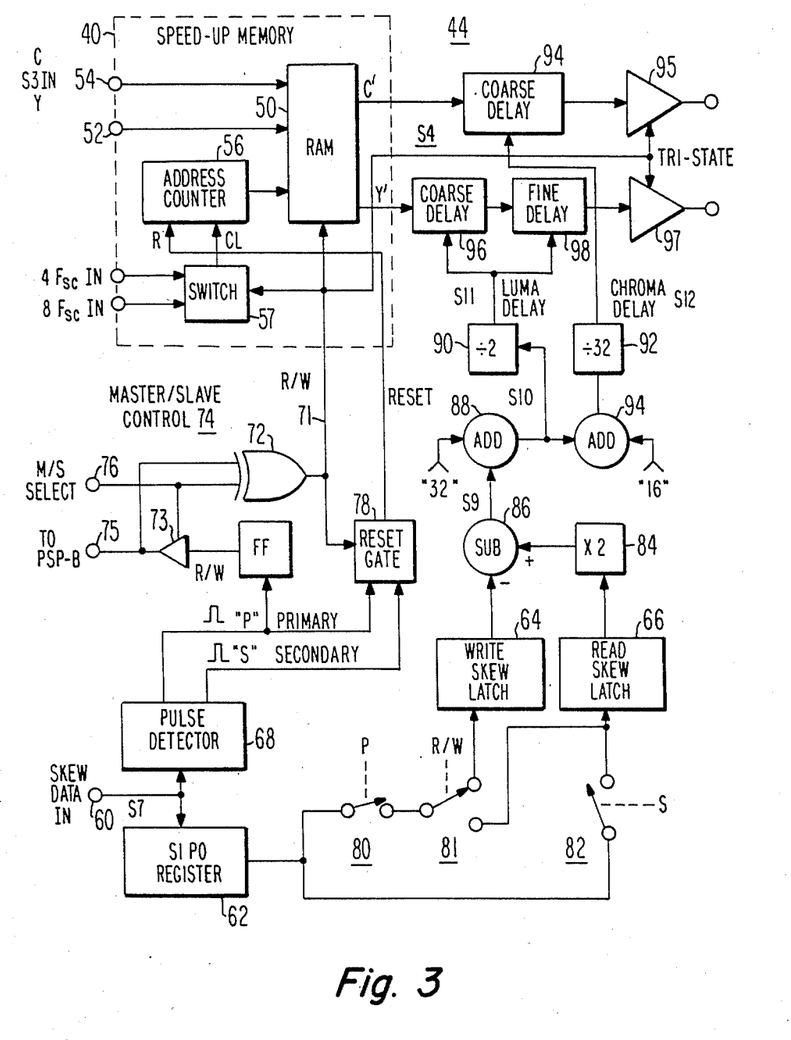
FIG. 3 is a block diagram of a progressive scan processor for use in the receiver of FIG. 1.

The double line-rate video output signal S6 on bus 48 is converted to analog from via a digital-to-analog converter 26 and then to component form (R, G, B) by matrix unit 27 for application to a display 30 (e.g., a kinescope or projection device). The sweep of display 30 is synchronized with signal S6 by means of double line rate horizontal sync signals 2-FH provided by horizontal processing unit 32 and normal field rate vertical sync signal FV provided by vertical processing unit 34 whereby an image is produced on display 30 having double the usual number of horizontal lines and thus reduced visibility of line structure. An integrated circuit which provides the functions of sync separator 22, horizontal processing unit 32 and vertical processing unit 34 is the type DPU 2532 Deflection Processor Unit which is described at pages 47–72 of the databook "Digit 2000 NTSC Double-Scan VLSI Digital TV System" of ITT Intermetall, edition 1985/5. For completeness of explanation of the operation of the present invention, a detailed block diagram of unit 32 is included herein (FIG. 4) and discussed subsequently. The databook also includes a description at pages 41–46 of a type "PSP 2032 Progressive Scan Processor" integrated circuit which may be used for processor PSP-A and PSP-B. FIG. 3 herein provides a detail block diagram of one of the two (identical) processors.

Without skew correction, the receiver of FIG. 1 would be sensitive to skew errors because the read/write clock 20 is locked to burst. Thus, when non-standard input signals are received (as hereinbefore defined)

the video input signal would be stored in the speed-up memory with one phase relative to the incoming sync and will be recovered from the memory and displayed with a different phase relative to the display sync. If uncorrected, the skew errors will result in undesirable visual artifacts being displayed such as ragged vertical edges, pixel missalignment and whole pixel discontinuities during occasional lines.

Skew errors are corrected in the receiver of FIG. 1 by means of correctors 44 and 46 which receive a skew data signal S7 in multiplexed form via conductor 33 from horizontal processing unit 32. The correction comprises delaying the video output signal of each speed-up memory in inverse proportion to the skew of the write clock and in direct proportion to the skew of the read clock. The term "skew" as used herein means the time difference, expressed in fractions of one clock cycle, of a given transition of a clock signal with respect to the horizontal synchronizing component of a video signal associated with the clock signal. The write clock skew is directly measured in unit 32 at the start of each memory write cycle and sent via conductor 33 to correctors 44 and 46 where it is used for two different purposes. Specifically, it is used to correct write skew errors of the speed-up memory which is writing (storing) a line of the video input signal. Secondly, it is used to correct read skew errors of the speed-up memory which is reading during the first read cycle of the memory. Recall that the read clock is operated at twice the frequency of the write clock. Accordingly, the read clock skew with respect to the double line-rate deflection has a predictable relationship with the write clock skew. Specifically, the read skew of each line recovered from speed-up memorys at the start of a read cycle equals twice the value of the write skew measured at the start of the read cycle. This follows because the read clock period is exactly one half of the write clock period. Thus, a write skew error of a given value need only be doubled to represent a read skew error for correcting the video output signal during the first one of the two memory read cycles. Since the write skew data is used for two purposes, it is hereinafter referred to as the "primary" skew data.

Memorys 40 and 42, it will be recalled, are read twice as quickly as they are written. If one were to use the measured write skew or "primary" skew for correcting all read skew errors, then each line read during the second memory read cycle would be displaced by one line's worth of skew that accumulated during the first read cycle thus producing a serrated edge effect in displayed images. This problem is solved by estimating the write clock skew with respect to the double line rate deflection and doubling the estimated value to arrive at the read clock skew for the lines produced during the second read cycle. The estimate of read clock skew for second memory read operations is performed by arithmetic circuits in processor 32 and is referred to herein as "secondary" skew. The calculation is made in unit 32 by measuring the period of the incoming horizontal sync pulses, dividing the period by two to give the period of the 2-FH deflection pulses and adding the result to the write clock skew. The fractional part of the sum represents the skew of the read clock with respect to the 2-FH deflection for all lines read from memory 50 during the second read cycle. This "secondary" skew data is stored alternately with the primary skew data in read skew latches in skew correctors 44 and 46 (as will be described) for controlling the delay of signal S6 directly in proportion to the read skew. Since the primary and secondary skew values are both derived from measurements of the write clock and not the read clock, these values of skew are doubled in correctors 44 and 46 when determining the delay imparted to the video output signal S6.

Figure 2:
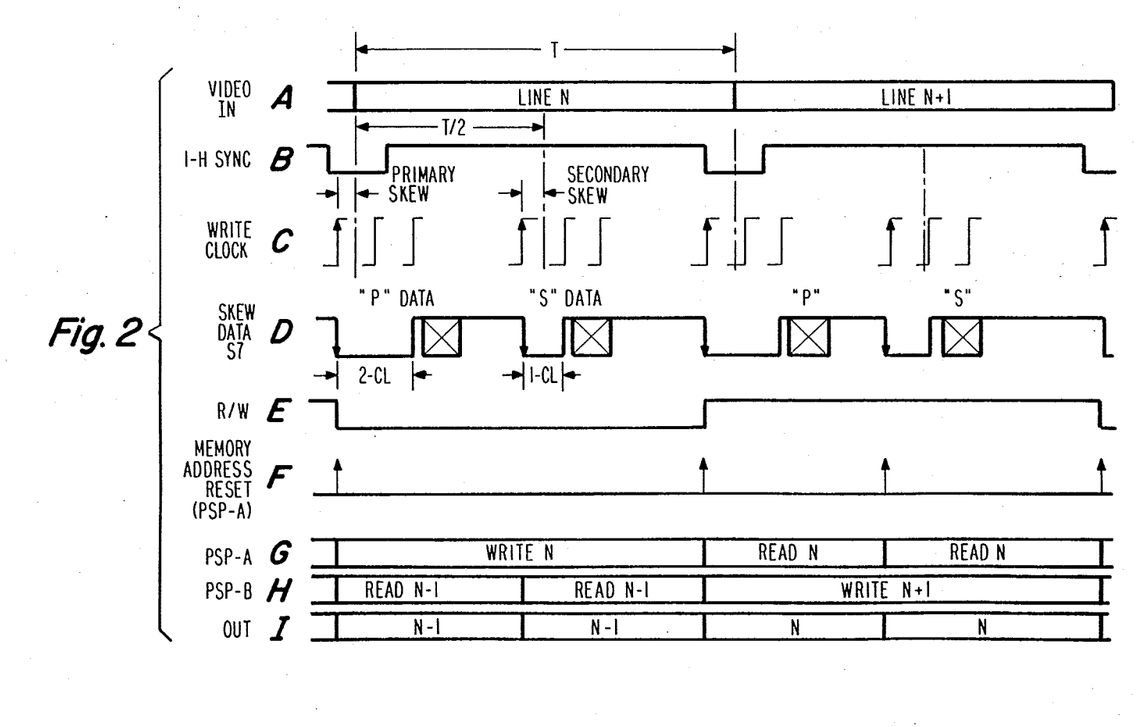
FIG. 2 is a timing diagram associated with the receiver of FIG. 1.

The primary and secondary skew data provided by processor 32 could be coupled directly skew correctors 44 and 46. If done in parallel form a large number of conductors would be required. This problem is avoided by sending the primary and secondary skew data in time division multiplexed form to skew correctors 44 and 46 via a single conductor 33. The data format is illustrated in FIG. 2 by waveform D (not to scale). The primary skew data for lines N, N+1, etc. is identified by a low level of the signal waveform for two clock cycles. This identifying "preamble" is followed by a five bit word representing the primary skew data. Five bits provide a measurement resolution of one thirty-second of one clock cycle.

The timing for the primary skew data transmission is provided by leading edge of the write clock (up arrow, waveform C) which preceeds the center of the incoming sync pulses (waveform B) of each line of the video input signal (waveform A). The leading edge of the primary skew data (down arrow), in turn, is used in the progressive scan processors for producing a read/write (R/W) control signal (waveform E) for memories 40 and 42. This control signal is inverted for one of the memories whereby memories 40 and 42 read and write on alternate lines of the input signal as shown by waveforms G and H.

The secondary skew data is transmitted one half of one line period (T/2) of the video input signal after the primary skew data and is preceeded by a one clock period preamble to distinguish it from the primary skew data. As will be explained, the leading edge (down arrow) of the secondary skew data is used in the progressive scan processors for initiating the second memory read operations. To summarize briefly, the primary skew data is used for the three functions of: (1) correcting the write skew of the memory that is storing the video input signal; (2) correcting the read skew of the first read cycle of the memory that is reading a stored line and (3) controlling the read/write operations of the memories. The secondary skew data is used for the two functions of: (1) correcting the skew of the second read operation of the memory being received; and (2) initiating the start of the second memory read operation.

Waveforms E and F illustrate the memory control functions of the skew data for PSP-A. At the start of line N the "P" data (D) sets the read/write line low (E) and initiates a reset pulse (F) for memory 40. This starts a write operation which continues throughout line N. The "S" data is not used during writing by PSP-A and is simply ignored. At the start of line N+1 the P data places the read/write line high and resets the address counter of memory 40 thereby initiating the first memory read operation. One half line later (T/2) the "S" data is received and resets the address counter of memory 40 thereby initiating the second read operation. The operation of PSP-B is much the same except that the read/write signal is inverted so that PSP-A and PSP-B alternately read and write. In each the secondary skew is used to initiate the second memory read operation by resetting the memory address counter.

The foregoing and further features of the invention are illustrated in greater detail in the block diagram of FIG. 3 of PSP-A. The other speed up processor PSP-B is identical to PSP-A and is synchronized therewith by means of a master-slave control circuit to ensure that the read/write operations are complementary.

The serial skew data (S7 shown as D of FIG. 2) produced by horizontal processing unit 32 is supplied (via conductor 33) to input termianl 60 of PSP-A where it is converted to parallel form by means of a serial-in parallel-out (SIPO) register 62 for storage in a write skew latch 64 and a read skew latch 66 for correcting skew errors of the video output signal S4 of memory 40 as will be described. Signal S7 is also applied to a pulse detector 68 which detects the width of the preamble pulse and provides output pulses P and S identifying the data is being "primary" or "secondary" as previously discussed. The skew data identifying pulses P and S provide the dual functions of (1) controlling the timing of read/write operations of the speed-up memory 40 (outlined in phantom) and (2) determining which of the read and write latches 66 and 64 receives the skew data provided by SIPO register 62.

Memory timing operations are controlled by pulses P and S as follows. Pulse P is applied to a flip-flop 70 which toggles each time pulse P is detected thereby producing a read/write control signal (R/W) as shown by waveform E of FIG. 2. Signal R/W is applied to a read/write control conductor 71 by means of an exclusive-OR gate 72 which, in combination with a tri-state buffer 73 forms a master/slave control circuit 74. Specifically, the output of flip-flop 70 is applied via buffer 73 to one input of gate 72 and via terminal 75 to a like termianl in PSP-B. A master slave selection terminal is coupled to the other input of gate 72 and to the tristate control terminal of buffer 73. Terminal 76 selects which of the two processors, PSP-A or PSP-B is the master and which is the slave to synchronize their respective memory read/write operations as follows. If terminal 76 is grounded, buffer 73 will be disabled. Terminal 75 then functions as an input for receiving R/W signals from PSP-B (the "master"). If, however, terminal 76 is connected to a source of positive voltage for PSP-A, then buffer 73 will be enabled and the R/W signal of flip flop 70 will be supplied to PSP-B and to gate 72 thus making PSP-A the "master" and PSP-B the "slave". The purpose of gate 72 is to ensure that the read/write signal for the master is complementary to that of the slave. This results becauise gate 72 inverts the R/W signal when terminal 76 is "high" (master operation) and does not invert signal R/W when terminal 76 is "low" (grounded).

The read/write signal on conductor 71 is combined with pulses P and S in a logic gate 78 to produce a reset pulse on conductor 77 for an address counter 56 in memory 40 in accordance with the following logic. Firstly, gate 78 couples pulse P to conductor 77 every time pulse P occurs. Secondly, gate 78 couples pulse S to reset conductor 77 whenever pulse S is present and the memory read/write line (71) is at a read state (low or high, depending on the logic convention used). In memory 40 conductor 71 is connected to the read/write control input of a random access memory (RAM) 50 and to a switch 57 which selectively applies the 4 Fsc write clock signal and the 8 Fsc read clock signal to the clock input of address counter 56.

Memory 50 has inputs 52 and 54 for receiving luma (Y) and chroma (C) components of the video input signal S3 from video processor 18 and outputs for providing double line-rate luma (Y') and chroma (C') components of the video output signal S4. In operation signal R/W changes state and counter 56 is reset each time the primary skew data is received. In the write mode, switch 57 applies the 4 Fsc write clock signal to counter 56 thereby storing the video input signal in RAM 50 at the addresses indicated by counter 56. In this write mode, receipt of the secondary skew data has no effect on the memory operation as shown by waveforms D-G of FIG. 2.

When the next primary skew data is received, pulse P toggles flip flop 70 and resets counter 56 via gate 78. This initiates the first read cycle of RAM 56 in which the signal previously stored in RAM 50 is recovered at the 8 Fsc read clock rate. It is instructive to note that if the video input signal S3 is a "standard" signal as hereinbefore defined, then it would occupy a total of 910 locations (addresses) in RAM 50 since there are exactly 910 pixels produced when an NTSC standard signal is clocked (sampled) at four-times the color subcarrier frequency (4 Fsc). Since, for such standard signals, the exact number of memory addreses is known, one could begin the second memory read cycle when 910 addresses had been read.

The timing of the start of the second memory read cycle, however, is not known beforehand where non-standard signals are involved. There may be more or less than 910 samples per line and the number may change significantly from line to line. The question, then, is when to start the second memory read operation for non-standard signals. The solution, for both standard and non-standard signals is to reset the address counter 56 whenever pulse S is received during a read operation. Recall that the secondary skew data is generated in processor 32 from a calculation of the half-period (T/2) of the video input signal S3 and is sent to PSP-A and PSP-B with this timing. Accordingly, if the period of the video input signal S3 varies, the start of the second memory read cycle will vary proportionally thereby automatically compensating for changes in the number of samples stored in RAM 50 for such non-standard signals.

The remaining elements of FIG. 3 provide skew correction of signal S4 and output multiplexing as follows. The skew data provided by SIPO register 62 is stored in latches 64 and 66 by means of switches 80, 81 and 83 in response to signals P, R/W and S as follows. When primary skew data is received, switch 80 closes in response to pulse P. Concurrently, flip flop 70 toggles thereby changing the state of the read/write signal. if the change is from read-to-write, then switch 81 stores the primary skew data in the write latch 64 for correcting write clock skew errors of the line being stored in RAM 50. Conversely, if the change is from write-to-read, switch 81 will store the primary skew data in the read latch 66 for correcting read clock skew errors during the first memory read cycle. Switch 82 stores the secondary skew data in the read latch 66 when pulse S is detected for correcting read clock skew errors during the second memory read cycle. To summarize, latch 64 always contains the primary skew data at the start of each memory write cycle and latch 66 contains the primary skew data at the start of the first memory read cycle and the secondary skew data at the start of the second memory read cycle.

Since all skew data is measured using the write clock FW or calculated from write clock measurements, the read skew data in latch 66 is doubled by means of a multiplier 84 to express it in proportion to the period of the read clock as previously explained. The output of latch 64 is subtracted in subtractor 86 from the output of multiplier 84 to provide a difference signal S9 which varies directly as the read skew and inversely as the write skew. Adder 88 adds a constant ("32") to signal S9 to avoid the need for "negative" delays when skew correcting the video output signal S4.

The skew correction signal S10 represents the net delay to be imparted to the double line-rate luminance Y' and chrominance C' components of signal S4 in terms of thirty-seconds of a clock period. This accuracy (5-bit resolution) is used in all arithmetic calculations to avoid an accumulation of arithmetic errors due, for example, to rounding-off or truncating numbers. It has been found that lower resolution may be used for the luma delay control signal (S11) and, additionally, that the chroma delay control signal (S12) may have substantially less resolution than that of the luma delay control signal if the value of the chroma control signal is "rounded-off" rather than being truncated. These functions are provided by divider 90 which divides signal S10 by two to develop the luma delay control signal S11. Divider 92 divides signal S10 by 32 to give chroma signal delays in terms of integer clock cycles. Adder 94 adds the number "16" to signal S10 prior to division by "32" to ensure that the result is rounded off to the nearest clock cycle rather than being truncated. As a result the chroma delay error relative to luma does not exceed more than one-half clock cycle even though the chroma is delayed in steps of one clock cycle by means of "coarse" delay unit 94. The term coarse delay, as used herein, means clock cycle delays.

Figure 7:
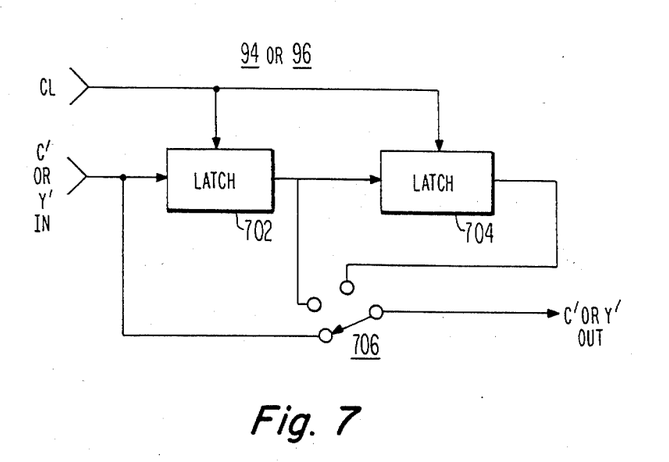

For this purpose, unit 94 may comprise a conventional cascade connection of clocked latches and a selector swith responsive to signal S12 for selecting the output of the appropriate latch in proportion to the value of signal S12. Such an arrangement, as described, is shown in FIG. 7 herein where latches 702 and 704 act as a shift register and switch 706 selects taps in the register for delaying signal C' in one clock period steps.

The luma signal correction is provided by a cascade correction of coarse and fine delay units 96 and 98, respectively. The integer portion of signal S11 is applied to delay unit 96 for delaying luma signal Y' in integer clock cycle steps. The fine resolution fractional portion of signal S11 is applied to unit 98 for delaying signal Y' in steps of one-sixteenth of a clock cycle. For this purpose unit 98 might be implemented by means of a cascade connection of (unclocked) logic gates having delays of 1/16th clock cycle and a selector switch much as in FIG. 7. Preferably, the dealy provided by unit 98 is provided by means of an interpolator such as the two-point linear interpolator of FIG. 6.

Figure 6:
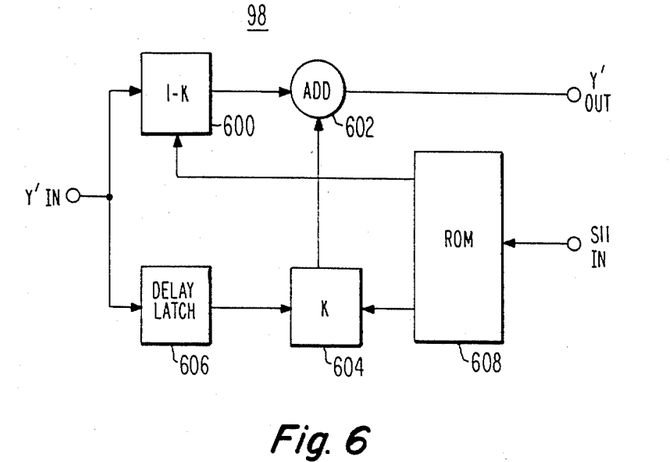
FIGS. 6 and 7 are block diagrams of delay devices suitable for use in the processor of FIG. 3.

In FIG. 6 the video signal to be delayed (Y') is applied via a multiplier 600 to one input of an adder 602 and via a cascade connection of another multiplier 604 and a delay latch 606 to the other input of adder 602. Latch 606 provides a one clock period delay (e.g., 35 nanoseconds). The multiplier coefficients (K and 1-K) are provided by a read only memory (ROM) 608 which varies the gain of multiplier 604 in direct proportion (K) to the skew data (S11) and varies the gain of multiplier 600 inversely (1-K) as the skew data whereby the ratio of delayed and non-delayed signals which are added in adder 602 are controlled by the values of the skew data. For example, when the skew data is zero the value of K is zero and the input signal passes without delay through multiplier 600 and adder 602 to the output. As K increases more of the delayed signal and less of the undelayed signal are added thereby increasing the delay of the output signal. In the limit (K=1) all of the input signal passes through the delay latch 606 to the output thereby delaying the signal by one full period of the clock.

Figure 4:
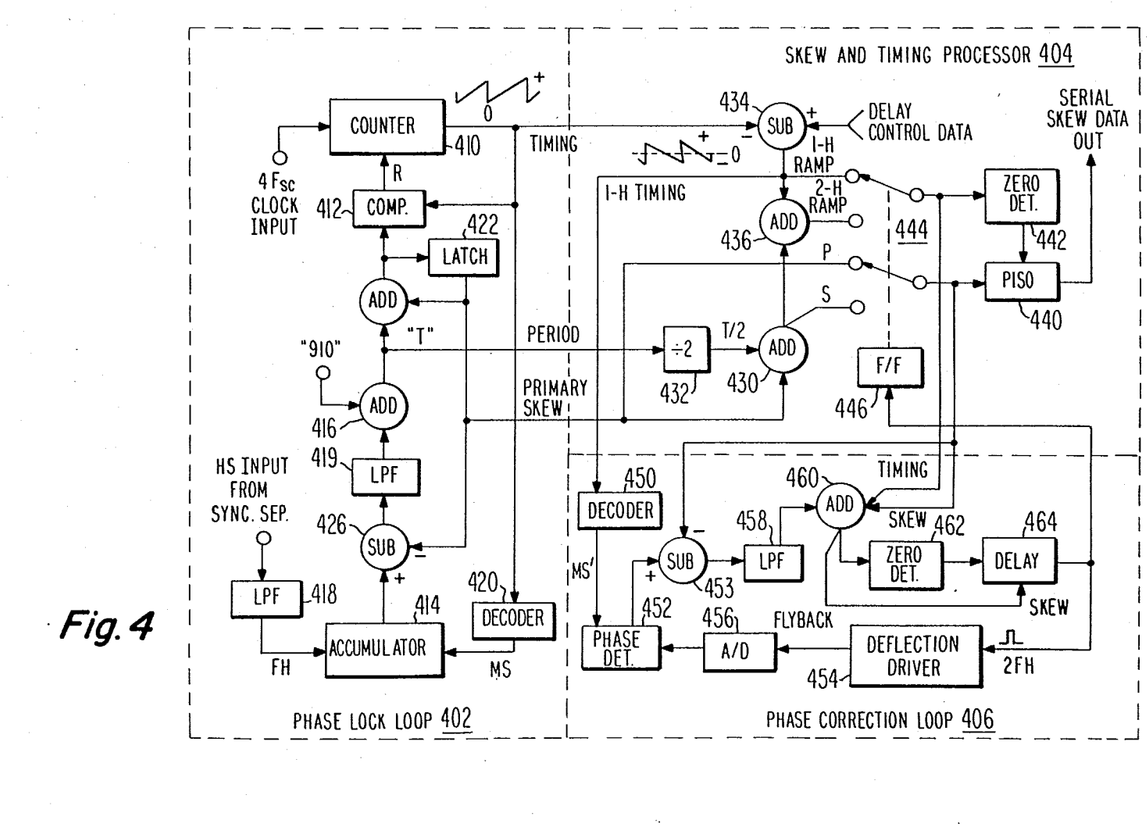
FIG. 4 is a block diagram of a horizontal processing unit for use in the receiver of FIG. 1.

FIG. 4 is a detailed block diagram of horizontal processing unit 32. The principal elements, outlined in phantom, comprise: (1) a phase lock loop 402 which measures the primary skew and measures the period of the horizontal synchronizing component of the video input signal; (2) a skew and timing processor 404 which calculates the secondary skew from the primary skew and the period of the video input signal and multiplexes the skew (and timing) data to flicker reduction processor 24; and (3) a phase correction loop 406 which generates double line rate deflection pulses (2 FH) for display unit 30. An integrated circuit which includes these elements is type DPU 2532 Deflection Processor Unit which is described at pages 47–72 of the databook "Digit 2000 NTSC Double-Scan VLSI Digital TV System" of ITT Intermetall, edition 1985/5.

Phase lock loop 402 (outlined in phantom) includes a counter 410 which is clocked by the 4 Fsc write clock signal FW and reset by a comparator 412 when the count equals the period, T, of the horizontal synchronizing component, FH, of the video input signal S3. The period of signal S3 is determined by means of an accumulator 414 and an adder 416 as follows. The sync signal FH from separator 22 is low pass filtered by filter 418 and applied to accumulator 414 which measures the time difference between the center of pulse FH and the occurrence of a master sync pulse MS provided by a decoder 420 coupled to the output of counter 410 (see FIG. 2, Waveform C). This time difference (or error) signal is scaled so as to represent the error in terms of cycles (and fractional cycles) of the write clock. It is then low pass filtered (in filter 419) and added in adder 416 to the number 910 which equals the number of 4 Fsc write clock periods in one line of an NTSC standard signal. The period indicating signal, T, thus provided by adder 416 controls the threshold of comparator 412 thereby locking counter 410 to the horizontal synchronizing component of the video input signal.

When non-standard signals are received the period of counter 410 will be in error by an amount equal to the skew of the write clock signal. This results because counter 410 only counts integer cycles of the write clock signal whereas the period of the sync pulses FH may include a fraction of one clock cycle. Since the master sync pulse MS is generated by decoding the count of counter 410 it, too, will occur only at integer cycles of the write clock and so will also be in error by the amount of the write clock skew. The output of accumulator 414 will also include the skew error because it is synchronized by pulse MS. The remaining elements of PLL 402 provide the function of detecting the skew of the write clock and correcting the skew error of the period signal, T.

Skew errors are detected by means of a latch 422 and an adder 424. Skew, it will be recalled, is the time difference between clock and sync expressed in fractions of a clock cycle as shown in FIG. 2. If it is assumed that the value of the period indicating signal, T, correctly represents the period of the video input signal, and if the fractional part of signal T is not zero then line-to-line changes in the skew will occur. As an example, if the period of signal FH is exactly 910.1 clock cycles long, then the write clock FW will precess with respect to sync (FH) at the rate of exactly 0.1 clock cycles per line. Thus, if the skew is zero at the start of line 1, it will be 0.1 at the start of line 2, 0.2 at the start of line 3 and so on. Skew data is generated by means of adder 424 which adds the skew of the previous line (stored in latch 422) to the period signal T. The fractional part of the sum is then stored in latch 422 which thus functions as an accumulator for the skew data. The integer part of the sum is applied to comparator 412 for adjusting the period of counter 410.

Skew detection was based on the assumption that the period indicating signal T correctly represented the period of the video input signal. From the previous discussion, however, the accumulator 414 output contains the skew error because it is timed by pulse MS which can only occur at integer clock cycles. This error is removed from signal T by means of subtractor 426 which subtracts the detected skew data provided by latch 422 from the output of accumulator 414.

Figure 5:
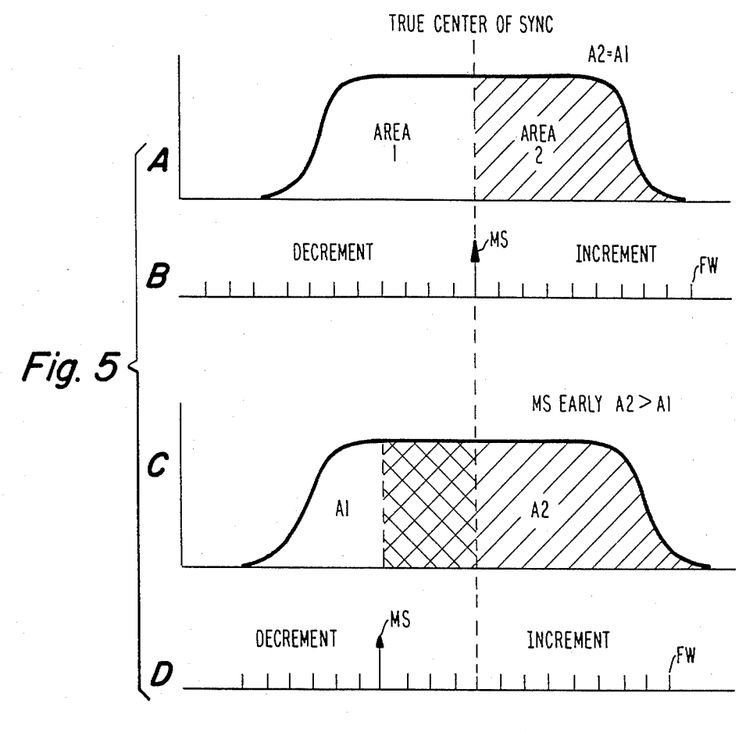
FIG. 5 is a diagram associated with the processing unit of FIG. 4.

Accumulator 414 provides phase measurements to an accuracy finer than the resolution of the system clock (FW). It may be constructed as described, for example, in U.S. Pat. No. 4,471,299 which issued Sept. 11, 1984. FIG. 5 herein provides a simplified illustration of how the measurements may be made. Waveform A shows pulse FH as a function of time. Accumulator 414 essentially measures the areas of pulse FH which preceed (Area 1) and follow (Area 2) pulse MS (Waveform B). This may be done by setting the accumulator count initially to zero, decrementing the count in proportion to the magnitude of pulse FH at each clock cycle (vertical tic marks) which preceed pulse MS and incrementing the count in proportion to the amplitude of pulse FH at each clock cycle after pulse MS. If pulse MS is exactly aligned with the center of pulse FH (as shown) then areas 1 and 2 will be equal and the accumulator output will be zero. If pulse MS preceeds the center of pulse FH, then the areas will differ (as shown in by C and D) and the accumulator output will be proportional to the cross-hatched area (A2 - A1). This area represent the time difference between pulse MS and the true center of the horizontal sync pulse FH. One may then scale the accumulator output to express the result in terms of write clock cycles (and fractions thereof).

Skew and timing processor 404 includes arithmetic ciruitry for deriving the secondary skew data from the primary skew data and multiplex circuitry for transmitting the skew data to PSP-A and PSP-B in the format shown by waveform D of FIG. 2. The secondary skew data S is produced by an adder 430 which adds the primary or write clock skew data P provided by latch 422 to the output of a divider 432 which divides the period signal T by 2. The fractional part of the sum of the half period (T/2) signal and the write clock or primary skew P is the skew of the read clock (secondary skew, S) for the second memory read cycle.

The integer part of the sum signal provided by adder 430 is used to generate double line-rate (i.e., 2-H) timing pulses as follows. The ramp signal produced by counter 410 ranges from zero to some maximum value (e.g., 910 for NTSC standard signals or within a few counts of 910 for non-standard signals). A subtractor 434 subtracts the counter signal from a constant (labeled "delay control data") thereby producing an inverted ramp (as shown) which begins at a positive value determined by the value of the delay control signal and proceeds through zero to a negative peak. Zero crossings are easily detected in digital system and by varying the delay control signal, the zero crossing time of the ramp may be advanced or retarded. Line rate timing pulses (1-H) are produced by detecting zero of the ramp signal provided by subtractor 434. Double line rate (2H) timing pulses are produced by offsetting the ramp by one-half period (T/2) and detecting zero. (The offset is provided by adder 436, detection is provided by a zero detector 442). By this means it is ensured that any change in the position of the line-rate (1-H) pulses will be tracked exactly by the double line-rate (2-H) pulses when the delay control signal is varied for such purposes, illustratively, as correcting the display sweep for processing delays the speeded-up video signal S4 may be subjected to.

The skew data is converted to serial form (FIG. 3 waveform D) by means of a parallel-in serial-out (PISO) register 440 which is timed by pulses produced by a zero detector 442. A line rate operated switch 444 alternately applies the 1-H and 2-H ramp signals (from subtractor 434 and adder 436 respectively) to detector 442 and alternately supplies the primary (P) and secondary (S) skew data (from latch 422 and adder 430, respectively) to PISO 440. Detector 442 triggers PISO 440 to transmit the P or S skew data to PSP-A and PSP-B when the 1-H or 2-H ramp signal it receives equals zero. Switch 444 is controlled by a flip flop 446 which divides double line rate (2-H) deflection pulses produced in phase correction loop 406 by two. Thus, as shown in FIG. 2 by waveforms D, E and F, the primary and secondary skew signals are multiplexed to PSP-A and PSP-B and processed as previously described.

Phase correction loop 406 receives the ramp signal of subtractor 434 and the timing and skew signals from switch 444 and generates double line-rate deflection signals (2-FH) for display 30. The ramp output of subtractor 434 is detected by a decoder 450 to provide a delayed, line-rate (1-H) master sync pulse (MS'). The double line-rate sync pulses 2FH are produced by means of a phase detector 452 which compares the phase of flyback pulses FB produced by a deflection driver 454 (and digitized by a converter 456) with pulse MS'. Since the master MS' occurs on a clock edge, it contains skew errors which in will appear in the output of phase detector 452. These errors are removed by subtractor 453 which subtracts the skew data of processor 404 from the output of detector 452. The error signal (at the output of subtractor 453) produced by detector 452 is low pass filtered in filter 458, and added in adder 460 to the timing and skew signals provided by switch 444. The integer part of the resultant sum signal is zero detected by detector 462 thereby producing double line-rate pulses 2-FH which are applied to the deflection driver via a delay unit 464 controlled by the fractional part of the sum signal provided by adder 460 to thereby correct for clock skew errors in the deflection pulses (2-FH). In effect, the same primary and secondary skew signals used for correcting memory read/write operations are applied to the deflection driver to ensure that the display sweep is corrected in the same manner as the memory skew errors. Accordingly, skew errors which are corrected in the flicker reduction processor 24 are not re-introduced by deflection skew errors.

What is claimed is:

1. In a progressive scan display system of the type comprising:
   (a) signal source means for providing a video input signal of a given line rate, a read clock signal and a write clock signal, said clock signals tending to exhibit skew when said video input signal is of non-standard form;

(b) video speed-up memory means coupled to said signal source means for storing a horizontal line of said video input signal during a write cycle of said memory means and for recovering the stored line during each of first and second read cycles of said memory means to provide a video output signal of double said given line rate;

(c) display means coupled to said memory means and synchronized therewith for displaying said video output signal; and (d) skew corrector means for generating read and write clock skew indicator signals and for imparting an effective delay to said video output signal as a direct function of said read clock skew indicator signal and as an inverse function of said write clock skew indicator signal during each said read cycle of said memory means for reducing visible artifacts on said display means due to skew of said clock signals;

the improvement, wherein said skew corrector means comprises:

(e) first means coupled to said signal source means for driving said read and write clock skew indicator signals from said write clock signal and said video input signal; and (f) second means in said skew corrector means for doubling the value of the derived read clock skew indicating signal for each said read cycle of said memory means and for subtracting therefrom the value of said write clock skew indicating signal of the preceeding write cycle of said memory means to form a control signal for controlling the effective delay imparted to said video output signal.

2. A system as recited in claim 1 further comprising third means in said skew corrector means responsive to said clock skew indicator signals for initiating said read and write cycles of said memory means.

3. A system as recited in claim 1 wherein said video output signal comprises a luminance and a chrominance component and wherein said second means includes means for effectively delaying said components as different functions of said control signal.

4. A system as recited in claim 1 wherein:

said first means comprises measurement means for proviidng a primary skew indicating signal representative of skew of said write clock signal at the beginning of each write cycle and each first read cycle of said memory means and a secondary skew indicating representative of skew of said write clock at the beginning of said second memory read cycle; and said second means comprises a first storage means for storing said primary skew indicating signal at the beginning of said write cycle and a second storage means for alternately storing said primary and secondary skew indicating signals at the beginning of said first and second read cycles, respectively, and means coupled to said storage means for forming said delay control signal.

5. Apparatus as recited in claim 4 wherein said second means includes gate means responsive to said primary and second skew indicating signals for initiating read and write cycles of said memory means.

6. A system as recited in claim 1 wherein said first means includes means for estimating a half-line period of said video input signal, means for adding said write clock skew indicating signal to the estimated half-period to form a sum signal having integer and fraction parts, means responsive to an integer part of said sum signal for producing a control pulse and wherein said second means includes means for coupling said control pulse to said memory means for initiating said second memory read cycle.

7. A system as recited in claim 1 wherein said video output signal comprises a luminance component and a chrominance component, said delay control signal comprises a binary signal manifestation and wherein said second means includes arithmetic means for rounding off fractional poritons of said binary signal manifestation to provide a modified signal manifestation for controlling the effective delay imparted to said chrominance component.

8. In a progressive scan display system of the type comprising a video speed-up memory means for doubling the horizontal line rate of a video input signal supplied thereto to provide a double line-rate video output signal to a display means, a source of read and write clock signals coupled to said memory means for controlling read and write operations thereof, and skew correction means for imparting variable delay to said double line-rate video outut signal for reducing visible artifacts on said display means caused by skew of said clock signals, the improvement wherein said skew correction means comprises:

first means responsive to said video input signal and said write clock signal for providing a write clock skew indicating signal;

second means coupled to the first means for deriving a read clock skew indicating signal from said write clock skew indicating signal; and third means coupled to said memory means for delaying said video output signal as a function of a difference between said write clock skew indicating and a multiple of said read clock skew indicating signal to minimize said visible artifacts on said display means.

9. A display system as recited in claim 8 wherein said third means includes means for doubling said read clock skew indicating signal and for subtracting therefrom said write clock skew indicating signal to form a delay control signal and delay means responsive thereto for delaying said video output signal.

10. A display system as recited in claim 8 wherein said video output signal comprises a luminance component and a chrominance component and said delay means is responsive to said delay control signal for imparting higher resolution delays to said luminance component than to said chrominance component.

11. A display system as recited in claim 8 wherein said second means comprises means for measuring the half-line period of said video input signal, for adding said write clock skew indicating signal thereto to form a sum signal having integer and fractional parts, said fractional part of said sum signal corresponding to said read clock skew indicating signal for each second read cycle of said memory means.

12. A display system as created in claim 8 wherein said video speed-up memory means is of a type in which each write cycle thereof is followed by first and second read cycles and wherein said third means includes a first memory for storing said write skew indicating signal at the start of each said first write cycle and a second memory for alternately storing said write skew and said read skew indicating signals at the start of respective ones of said first and second ready cycles.

* * * * *